US012765544B2

(12) United States Patent
Cai et al.

(10) Patent No.: US 12,765,544 B2
(45) Date of Patent: Oct. 20, 2026

(54) USE OF HIGHER FATTY ALCOHOL IN FATTY ACID METABOLIC PATHWAY OF CRUCIFEROUS PLANT

(71) Applicant: ZHUHAI RUNNONG SCIENCE AND TECHNOLOGY CO. LTD, Zhuhai (CN)

(72) Inventors: Dianxian Cai, Zhuhai (CN); Yunhao Sun, Zhuhai (CN); Xiaoming Peng, Zhuhai (CN); Guohui Yu, Zhuhai (CN); Di Qin, Zhuhai (CN)

(73) Assignee: ZHUHAI RUNNONG SCIENCE AND TECHNOLOGY CO. LTD, Zhuhai (CN)

( * ) Notice: Subject to any disclaimer, the term of this patent is extended or adjusted under 35 U.S.C. 154(b) by 227 days.

(21) Appl. No.: 18/651,711

(22) Filed: May 1, 2024

(65) Prior Publication Data

US 2024/0298637 A1 Sep. 12, 2024

Related U.S. Application Data

(63) Continuation of application No. PCT/CN2021/128778, filed on Nov. 4, 2021.

(51) Int. Cl.

| | |
|---|---|
| ***A01N 31/02*** | (2006.01) |
| ***A01N 25/04*** | (2006.01) |
| ***A01P 3/00*** | (2006.01) |
| ***A01P 7/04*** | (2006.01) |
| ***A01P 21/00*** | (2006.01) |

(52) U.S. Cl.

CPC ............. *A01N 31/02* (2013.01); *A01N 25/04* (2013.01); *A01P 3/00* (2021.08); *A01P 7/04* (2021.08); *A01P 21/00* (2021.08)

(58) Field of Classification Search

CPC . A01N 31/02; A01N 25/04; A01P 3/00; A01P 7/04; A01P 21/00; C05F 11/10

See application file for complete search history.

(56) References Cited

FOREIGN PATENT DOCUMENTS

| | | | |
|---|---|---|---|
| CN | 101946766 A | | 1/2011 |
| CN | 109769538 A | | 5/2019 |
| CN | 109769550 A | | 5/2019 |
| CN | 109874579 A | | 6/2019 |
| CN | 109924057 A | | 6/2019 |
| CN | 111513062 A | | 8/2020 |
| WO | WO 2023077377 A1 | * | 5/2023 |

OTHER PUBLICATIONS

Cai et al. WO 2023077377 English translation (Year: 2023).*
Cai et al. CN 109769550 English translation (Year: 2019).*
Lv et al. CN 101946766 English translation (Year: 2011).*
Peng et al. CN 111513062 English translation (Year: 2020).*
Qui et al. CN 109874579 English translation (Year: 2019).*
The Extended European Search Report Issued on Jul. 15, 2025 for Corresponding European Patent Application No. 21962894.8.

* cited by examiner

*Primary Examiner* — Robert A Wax

(57) ABSTRACT

The emulsifiers containing higher fatty alcohols can affect the transcription levels of genes related to phenylpropanoid-related biosynthetic pathway, fatty acid metabolic pathway, and brassinolide and strigolactone biosynthetic pathways through external application, thereby improving the disease resistance of cruciferous plants, improving quality and increasing yield, and achieving high-quality and high-yield production of cruciferous plants.

18 Claims, No Drawings

USE OF HIGHER FATTY ALCOHOL IN FATTY ACID METABOLIC PATHWAY OF CRUCIFEROUS PLANT

CROSS-REFERENCE TO RELATED APPLICATIONS

The present application is a Continuation Application of PCT Application No. PCT/CN2021/128778, filed on Nov. 4, 2021, the entire contents of which are hereby incorporated by reference.

TECHNICAL FIELD

The present disclosure relates to the use of higher fatty alcohol in fatty acid metabolic pathway of cruciferous plant.

DESCRIPTION OF THE PRIOR ART

Cruciferous plants include many important economic crops such as vegetables and oil crops in China. Among them, Chinese cabbage, cabbage, radish, etc. are related to the safety of Chinese vegetable, while rapeseed is an important oil crop related to the safety of Chinese edible oil. Cruciferous vegetables and oil crops are extremely susceptible to pests and diseases, and adversity during growing, making it extremely difficult to achieve high quality and high yield through cultural practices in the production of such economic crops.

SUMMARY OF THE DISCLOSURE

In order to overcome the shortcomings of the prior art, the object of the present disclosure is to provide a use of a higher fatty alcohol in the fatty acid metabolic pathway of the cruciferous plant.

In order to solve the above problems, the present disclosure adopts the technical solution as follows.

The present disclosure provides a use of a higher fatty alcohol in preparing a preparation for increasing the transcription level of the genes related to the fatty acid metabolic pathway of the cruciferous plant. Furthermore, the higher fatty alcohol is used to increase a crop resistance to fungal diseases and insect pests by increasing the transcription level of the genes related to the fatty acid metabolic pathway of the cruciferous plant.

In another aspect, the present disclosure provides a use of a higher fatty alcohol in preparing a preparation for increasing the transcription level of the genes related to the brassinolide biosynthetic pathway of the cruciferous plant. Furthermore, the higher fatty alcohol is used to regulate plant growth and development by increasing the transcription level of the genes related to the brassinolide biosynthetic pathway of the cruciferous plant.

In another aspect, the present disclosure provides a use of a higher fatty alcohol in preparing a preparation for increasing the transcription level of the genes related to the strigolactone biosynthetic pathway of the cruciferous plant. Furthermore, the higher fatty alcohol is used to improve plant nutrition by increasing the transcription level of the genes related to the strigolactone biosynthetic pathway of the cruciferous plant.

In this embodiment, the higher fatty alcohol is one of dodecyl alcohol and cetyl alcohol or a mixture of the two.

Further, the preparation is an aqueous emulsion, which includes higher fatty alcohol, emulsifier, thickener, and water.

The preparation containing the higher fatty alcohol of the present disclosure is not limited to an aqueous emulsion. All dosage forms based on the inventive concept of the present disclosure are possible, such as wettable powders, emulsions, sprayable solutions, concentrated emulsions, aerosols, and seed coatings.

Compared with the prior art, the benefits of the present disclosure are as follows.

The present disclosure uses advanced transcriptome and metabolome sequencing and analysis technologies to screen emulsifiers containing higher fatty alcohols and find that emulsifiers containing higher fatty alcohols can affect the transcription levels of genes related to phenylpropanoid-related biosynthetic pathway, fatty acid metabolic pathway, and brassinolide and strigolactone biosynthetic pathways through external application, thereby improving the disease resistance of cruciferous plants, improving quality and increasing yield, and achieving high-quality and high-yield production of cruciferous plants.

DESCRIPTION OF EMBODIMENTS

Example 1

This example provides an aqueous emulsion containing higher fatty alcohol, which is composed of the following components in weight percentage: 24% dodecyl alcohol, 3% cetyl alcohol, 3% emulsifier, 5% thickener, and the remaining is water.

In this example, the emulsifier is polyoxyethylene fatty acid, and the thickener is methyl cellulose.

This example also provides a preparation method for the above-mentioned aqueous emulsion, which includes the following steps:

placing dodecyl alcohol and cetyl alcohol into a container and heating to 60° C. to melt, adding emulsifier to the container, processing with a high-shear homogenizer at a rotational speed of 5000 rpm for 10 minutes, adding water at 60° C. to the container, processing with a high-shear homogenizer at a rotational speed of 10,000 rpm for 10 minutes, cooling to 40° C., adding thickener to the container and processing with a high-shear homogenizer at a rotational speed of 10,000 rpm for 30 minutes, thereby obtaining the aqueous emulsion.

Example 2

This example provides an aqueous emulsion containing higher fatty alcohol, which is composed of the following components in weight percentage: 35% dodecyl alcohol, 5% cetyl alcohol, 5% emulsifier, 5% thickener, and the remaining is water.

In this example, the emulsifier is polyoxyethylene fatty acid, and the thickener is methyl cellulose.

This example also provides a preparation method for the above-mentioned aqueous emulsion, which includes the following steps:

placing dodecyl alcohol and cetyl alcohol into a container and heating to 60° C. to melt, adding emulsifier to the container, processing with a high-shear homogenizer at a rotational speed of 5000 rpm for 10 minutes, adding water at 60° C. to the container, processing with a high-shear homogenizer at a rotational speed of 10,000 rpm for 10 minutes, cooling to 40° C., adding thickener to the container and processing with a high-shear homogenizer at a rotational speed of 10,000 rpm for 30 minutes, thereby obtaining the aqueous emulsion.

Example 3

This example provides an aqueous emulsion containing higher fatty alcohol, which is composed of the following components in weight percentage: 30% dodecyl alcohol, 3% emulsifier, 5% thickener, and the remaining is water.

In this example, the emulsifier is polyoxyethylene fatty acid, and the thickener is methyl cellulose.

This example also provides a preparation method for the above-mentioned aqueous emulsion, which includes the following steps:

placing dodecyl alcohol into a container and heating to 60° C. to melt, adding emulsifier to the container, processing with a high-shear homogenizer at a rotational speed of 5000 rpm for 10 minutes, adding water at 60° C. to the container, processing with a high-shear homogenizer at a rotational speed of 10,000 rpm for 10 minutes, cooling to 40° C., adding thickener to the container and processing with a high-shear homogenizer at a rotational speed of 10,000 rpm for 30 minutes, thereby obtaining the aqueous emulsion.

Example 4

This example provides an aqueous emulsion containing higher fatty alcohol, which is composed of the following components in weight percentage: 10% cetyl alcohol, 3% emulsifier, 5% thickener, and the remaining is water.

In this example, the emulsifier is polyoxyethylene fatty acid, and the thickener is methyl cellulose.

This example also provides a preparation method for the above-mentioned aqueous emulsion, which includes the following steps:

Placing cetyl alcohol into a container and heating to 60° C. to melt, adding emulsifier to the container, processing with a high-shear homogenizer at a rotational speed of 5000 rpm for 10 minutes, adding water at 60° C. to the container, processing with a high-shear homogenizer at a rotational speed of 10,000 rpm for 10 minutes, cooling to 40° C., adding thickener to the container and processing with a high-shear homogenizer at a rotational speed of 10,000 rpm for 30 minutes, thereby obtaining the aqueous emulsion.

Example 5: Effect of Aqueous Emulsion Containing Higher Fatty Alcohol on Transcription Level of Genes Related to *Arabidopsis thaliana* Metabolic Pathway The phenylpropanoid metabolic pathway is one of the most important plant secondary metabolic pathways and plays an important role in plant growth and development and plant-environment interactions. This pathway includes multiple branched pathways involved in the synthesis of substances such as lignin and flavonoids. Lignin is mainly accumulated in secondary cell walls and participates in the process of providing mechanical support, water and nutrient transport, resistance to pests and diseases, and resistance to abiotic stress. Metabolites such as isoflavones in flavonoids are involved in physiological processes such as reducing ultraviolet damage to plant cells, scavenging reactive oxygens, resistance to diseases, and resistance to uncomfortable temperatures and high-salt drought conditions. Fatty acid metabolism is involved in the synthesis of disease-resistant substances of plants, and the upregulation of transcription level of genes related to the pathway thereof can significantly increase crop resistance to fungal diseases and insect pests. Brassinolide can regulate plant growth and development, such as promoting cell division, hypocotyl elongation, delaying leaf senescence, etc. . . . Strigolactone plays an important role in plant adaptation to the environment and controlling the plant growth process. Strigolactone can promote symbiosis of plants with soil microorganisms. Due to the lack of nutrients in barren land, plants are stimulated to synthesize more active strigolactone, accelerating the release of the strigolactone into the soil, increasing the absorption of N and P nutrients by plants, thereby promoting symbiosis with fungi and improving nutritional status.

Plant samples were treated with the aqueous emulsions containing higher fatty alcohol (with different higher fatty alcohol ratios) of the present disclosure, transcriptome sequencing was performed, and the effect of the aqueous emulsions containing higher fatty alcohol of the present disclosure on the transcription level of genes related to the above *Arabidopsis thaliana* metabolic pathway was analyzed.

(1) Fatty alcohol sample: the aqueous emulsions containing higher fatty alcohol of the present disclosure listed in Table 1

TABLE 1

| Sample number | | |
|---|---|---|
| Sample number | Sample S component | Sample Control |
| | Example 1 | water |

(2) Tested plant: *Arabidopsis thaliana* (Col-0)

Culture conditions for the plant: 70/0 μmol $m^{-2}$ $s^{-1}$ (light intensity of light/dark cycle), 14 hours/10 hours (time of light/dark cycle), 23° C./21° C., 70% relative humidity, four weeks.

(3) Sample processing and data collection

Healthy plants with similar growth status from groups were selected, the leaves of the plants were sprayed with a dilution of the above sample (900 times diluted with water) until the leaf surface is completely covered with the liquid film. The control group was sprayed with the same amount of sterile water for diluting the raw solution. A second spraying treatment was performed after 48 hours. Each group includes 3 biological replicates.

After 72 hours for the first treatment, 4 grams of leaf samples from each group were collected. After flash freezing in liquid nitrogen for 3 minutes, the samples were sent to the laboratory of Wuhan Metware Biotechnology Co., Ltd. in dry ice for transcriptome sequencing (all metabolome and transcriptome sequencing data below are provided by Wuhan Metware Biotechnology Co., Ltd.).

(4) Effect of aqueous emulsion containing higher fatty alcohol on transcription level of genes related to *Arabidopsis thaliana* metabolic pathway:

As shown in Table 2, after using S sample and water to treat peanut leaves for 72 hours, the transcription levels of genes related to phenylpropanoid-related biosynthetic pathway, fatty acid metabolic pathway, and brassinolide and strigolactone biosynthetic pathways were significantly upregulated compared to the control group.

TABLE 2 ratios of pathway-related genes in *Arabidopsis thaliana* plant leaves in different treatment groups (up-regulation fold)

| Name of protein encoded by genes related to phenyl-propanoid metabolic pathway | *Arabidopsis thaliana* S/ Control | Name of protein encoded by genes related to fatty acid metabolic pathway | *Arabidopsis thaliana* S/ Control | Name of protein encoded by genes related to brassinolide and strigolactone biosynthetic pathways | *Arabidopsis thaliana* S/ Control |
|---|---|---|---|---|---|
| caffeoyl-CoA O-methyltransferase | 4.47 | 3-oxoacyl-[acyl-carrier protein] reductase | 4.35 | squalene monooxygenase | 10.18 |
| cinnamyl-alcohol dehydrogenase | 28.76 | 3-ketoacyl-CoA synthase | 2.88 | lysosomal acid lipase/cholesteryl ester hydrolase | 3.87 |
| Peroxidase | 23.75 | acyl-CoA oxidase | 2.22 | sterol 22-desaturase | 9.44 |
| caffeic acid 3-O-methyltransferase | 6.31 | acyl-CoA dehydrogenase | 2.41 | brassinosteroid-6-oxidase 1 | 5.94 |
| beta-glucosidase | 9.27 | aldehyde dehydrogenase (NAD+) | 3.49 | | |
| chalcone synthase | 2.45 | alcohol dehydrogenase 1/7 | 11.70 | | |
| flavonoid 3'-monooxygenase | 2.05 | (Z)-3-hexen-1-ol acetyltransferase | 2.74 | | |
| isoflavone 3'-hydroxylase | 5.71 | alcohol dehydrogenase class-P | 11.63 | | |
| | | acetyl-CoA acyltransferase | 2.267 | | |

Example 6: Effect of Applying Aqueous Emulsion Containing Higher Fatty Alcohol on Pakchoi Sampling: sample S is the aqueous emulsion containing higher fatty alcohol prepared in Example 1

Crop: pakchoi

Location: Modern Agriculture Development Research Center, Zhuhai City, Guangdong Province Method: a 0.33 ha test group and a 0.33 ha control group at the production base were selected to conduct pilot production according to Table 3.

TABLE 3 protocol for higher fatty alcohol mixture of the present disclosure on pakchoi

| Serial Number | Treatment Period | Test group | Control Group |
|---|---|---|---|
| 1 | after seedlings, spraying once every 7 days for a total of 3 times | diluting sample S 900 times with water and spraying once; sample dosage: 50 mL/0.067 ha/time | spraying with the same amount of water while treating the test group |

Comparison of Application Effects

The pakchoi of the test group treated with the aqueous emulsion containing higher fatty alcohol of the present disclosure showed no obvious diseases during the entire growth process, and had obvious advantages in growth and appearance, with greater plant height and darker and glossy leaf color. In the control group, diseases such as powdery mildew and anthracnose were found throughout the growth process, and the growth and appearance were significantly poor.

After picking, the test results are as follows.

TABLE 4 test results of the aqueous emulsion containing higher fatty alcohol of the present disclosure on pakchoi

| Serial Number | Item | Test group | Control Group |
|---|---|---|---|
| 1 | average plant height (cm) | 27.6 | 24.7 |
| 2 | leaf color | dark green | light green |
| 3 | atem base thickness (mm) | 12.0 | 10.5 |
| 4 | number of tillers (ea/plant) | 7 | 6 |
| 5 | individual plant weight (g) | 44.2 | 40.6 |
| 6 | equivalent yield (kg/0.067 ha) | 1544.1 | 1414.0 |

The pakchoi in the test group treated with the aqueous emulsion containing higher fatty alcohol of the present disclosure had fewer pests and diseases, more tillers, and the plant height, stem base thickness and individual plant weight are all significantly greater than those in the control group, and the pakchoi yield increase rate reaches 9.2%.

Example 7: Effect of Applying Aqueous Emulsion Containing Higher Fatty Alcohol on White Radish Sampling: sample S is the aqueous emulsion containing higher fatty alcohol prepared in Example 1

Crop: white radish

Location: Mashi Town, Shixing County, Shaoguan City, Guangdong Province

Method:

a 0.33 ha test group and a 0.33 ha control group were selected at the production base. The test group was produced as follows: sample S was diluted 900 times with water and sprayed once in the seedling stage, fleshy root formation stage, and expansion stage respectively, with an interval of 15 days and a sample dosage of 20 mL/0.067 ha each time, while the control group was sprayed with the same amount of water.

Comparison of Application Effects

Compared with the control group, the white radish in the test group treated with the aqueous emulsion containing higher fatty alcohol of the present disclosure grew faster and the growth period thereof was greatly shortened: seedlings were selected (thinning) 5 days in advance and time to harvest and market was advanced 15 days; in terms of appearance, the leaf diameter is thick and the leaf color is green and glossy; no obvious diseases were found in the test group during the entire growth process. However, downy mildew, black spot and other diseases were found in the control group.

The radish fruits in the test group were thick and white in appearance, had a large average diameter, a longer length, and a better appearance. The yield is 32.5% higher than that in the control group. The radish fruits in the test group tasted crisp and sweet, with a good taste. However, the radish fruits in the control group tasted harder.

Example 8: Effect of Applying Aqueous Emulsion Containing Higher Fatty Alcohol on Choy Sum Sampling: sample S is the aqueous emulsion prepared in Example 1

Crop: choy sum

Location: Mashi Town, Shixing County, Shaoguan City, Guangdong Province

Method: a 0.167 ha test group and a 0.167 ha control group at the production base were selected to conduct pilot production according to Table 5.

TABLE 5 protocol for the aqueous emulsion containing higher fatty alcohol of the present disclosure on choy sum

| Serial Number | Treatment Period | Test group | Control Group |
|---|---|---|---|
| 1 | after planting, spraying once every 7 days for a total of 3 times | diluting sample S 900 times with water and spraying once; sample dosage: 40 mL/0.067 ha/time | spraying with the same amount of water while treating the test group |

Comparison of Application Effects

Compared with the control group, the choy sum in the test group treated with the aqueous emulsion containing higher fatty alcohol of the present disclosure had a greater plant height, larger leaves, and the leaf color is green and glossy. No obvious diseases were found in the entire growth process of the test group. Diseases such as black spot and downy mildew were found throughout the growth process of the control group.

After picking, the test results are as follows:

TABLE 6 test results of the aqueous emulsion containing higher fatty alcohol of the present disclosure on choy sum

| Serial Number | Item | Test group | Control Group |
|---|---|---|---|
| 1 | average plant height (cm) | 13.6 | 12.9 |
| 2 | average leaf width (cm) | 2.85 | 2.63 |
| 3 | average leaf length (cm) | 11.7 | 10.7 |
| 4 | number of leaves (pieces/plant) | 10.2 | 9.5 |
| 5 | stem base thickness (cm) | 0.39 | 0.33 |
| 6 | equivalent yield (kg/0.067 ha) | 1593.3 | 1419.4 |

The choy sum in the test group treated with the aqueous emulsion containing higher fatty alcohol of the present disclosure had fewer diseases, and the plant height, stem base thickness, and leaf length and width were significantly greater than those in the control group, and the choy sum yield increase rate reached 12.2%.

It can be concluded from Example 5 that the treatment of the cruciferous plant (*Arabidopsis thaliana*) with the aqueous emulsion containing higher fatty alcohol according to the present disclosure diluted with water can affect the transcription levels of genes related to phenylpropanoid-related biosynthetic pathway, fatty acid metabolic pathway, and brassinolide and strigolactone biosynthetic pathways, thereby effectively promoting the physical and chemical resistance to diseases of the cruciferous plant, improving quality, and increasing yield. The application effects of Example 6, Example 7 and Example 8 in the field show that the use of the aqueous emulsion containing higher fatty alcohol of the present disclosure can shorten the production cycle of pakchoi, white radish, and choy sum, reduce diseases, improve quality, and increase yield.

It can be concluded from Example 5 to Example 8 that the application of the aqueous emulsion containing higher fatty alcohol of the present disclosure on cruciferous plants can significantly affect the phenylpropanoid-related biosynthetic pathway and the fatty acid metabolic pathway in the cruciferous plants and promote crop resistance to diseases, increase the transcription levels of genes related to the brassinolide and strigolactone biosynthetic pathways, promote cell division, delay leaf senescence, and improve crop nutrient absorption, thereby promoting disease resistance, improving quality and increasing yield of cruciferous plants in practical agricultural production.

The above embodiments are only preferred embodiments of the present disclosure and are not intended to limit the scope of protection of the present disclosure. Any non-substantive changes and substitutions made by those skilled in the art on the basis of the present disclosure fall within the claimed protection scope of the present disclosure.

The invention claimed is:

1. A method for increasing resistance of cruciferous plants to fungal diseases and insect pests, comprising applying to a cruciferous plant an effective amount of a preparation of higher fatty alcohol, wherein the preparation upregulates a transcription level of genes related to a fatty acid metabolic pathway of the cruciferous plant to increase crop resistance to fungal diseases and insect pests, wherein the preparation is free of any additional fungicide, bactericide, or insecticide.

2. A method for regulating growth and development of a cruciferous plant, comprising applying to a cruciferous plant an effective amount of a preparation of higher fatty alcohol, wherein the preparation upregulates a transcription level of genes related to a brassinolide biosynthetic pathway of the cruciferous plant to regulate plant growth and development, wherein the preparation is free of any additional fungicide, bactericide, or insecticide.

3. A method for improving nutrition of a cruciferous plant, comprising applying to a cruciferous plant an effective amount of a preparation of higher fatty alcohol, wherein the preparation upregulates a transcription level of genes related to a strigolactone biosynthetic pathway of the cruciferous plant to improve plant nutrition, and wherein the preparation is free of any additional fungicide, bactericide, or insecticide.

4. The method of claim 1, wherein the higher fatty alcohol is one of dodecyl alcohol and cetyl alcohol or a mixture of dodecyl alcohol and cetyl alcohol.

5. The method of claim 2, wherein the higher fatty alcohol is one of dodecyl alcohol and cetyl alcohol or a mixture of dodecyl alcohol and cetyl alcohol.

6. The method of claim 3, wherein the higher fatty alcohol is one of dodecyl alcohol and cetyl alcohol or a mixture of dodecyl alcohol and cetyl alcohol.

7. The method of claim 1, wherein the preparation is an aqueous emulsion comprising the higher fatty alcohol, an emulsifier, a thickener, and water.

8. The method of claim 2, wherein the preparation is an aqueous emulsion comprising the higher fatty alcohol, an emulsifier, a thickener, and water.

9. The method of claim 3, wherein the preparation is an aqueous emulsion comprising the higher fatty alcohol, an emulsifier, a thickener, and water.

10. The method of claim 1, wherein the cruciferous plant is *Arabidopsis thaliana*, pakchoi, white radish, or choy sum.

11. The method of claim 2, wherein the cruciferous plant is *Arabidopsis thaliana*, pakchoi, white radish, or choy sum.

12. The method of claim 3, wherein the cruciferous plant is *Arabidopsis thaliana*, pakchoi, white radish, or choy sum.

13. The method of claim 1, wherein the preparation is applied once every 7 days for a total of 2 to 4 times.

14. The method of claim 2, wherein the preparation is applied once every 7 days for a total of 2 to 4 times.

15. The method of claim 3, wherein the preparation is applied once every 7 days for a total of 2 to 4 times.

16. The method of claim 7, wherein the emulsifier is polyoxyethylene fatty acid, and the thickener is methyl cellulose.

17. The method of claim 8, wherein the emulsifier is polyoxyethylene fatty acid, and the thickener is methyl cellulose.

18. The method of claim 9, wherein the emulsifier is polyoxyethylene fatty acid, and the thickener is methyl cellulose.

* * * * *